May 22, 1956        J. F. BAYHI        2,747,172

GEOPHONE ARRANGEMENT FOR SEISMIC PROSPECTING

Filed Nov. 12, 1954        3 Sheets-Sheet 1

Joseph F. Bayhi    Inventor
By   *W. N. Wright*    Attorney

May 22, 1956 J. F. BAYHI 2,747,172
GEOPHONE ARRANGEMENT FOR SEISMIC PROSPECTING
Filed Nov. 12, 1954 3 Sheets-Sheet 2

Joseph F. Bayhi    Inventor

By W. N. Wright    Attorney

May 22, 1956 — J. F. BAYHI — 2,747,172
GEOPHONE ARRANGEMENT FOR SEISMIC PROSPECTING
Filed Nov. 12, 1954 — 3 Sheets-Sheet 3

Joseph F. Bayhi — Inventor
By W. N. Wright — Attorney

United States Patent Office 2,747,172
Patented May 22, 1956

2,747,172
GEOPHONE ARRANGEMENT FOR SEISMIC PROSPECTING

Joseph F. Bayhi, Tulsa, Okla., assignor to Esso Research and Engineering Company, a corporation of Delaware Application November 12, 1954, Serial No. 468,303

7 Claims. (Cl. 340—15)

This invention relates to improved methods of seismic prospecting and more particularly to a geophone arrangement wherein the ratio of desired reflection energy to interference energy is considerably improved.

A method commonly employed in searching for areas likely to contain oil or other mineral deposits is that known as seismic prospecting wherein a seismic disturbance is initiated at a selected point in or on the earth's surface as, for example, by detonating an explosive charge in a shot hole, which causes seismic waves to travel through the earth and to be reflected from various substrata, the upward traveling reflected waves being detected at a number of points spread out in a desired pattern from the point of the initial seismic disturbance. Sensitive pickups, called seismometers, or geophones, are arranged at the detection points to translate the detected motion into electrical impulses which after suitable amplification are recorded on a seismograph. The records may be in the form of waves or traces representative of the seismic waves that have been picked up by the individual geophones or they may be in the form of variable density or variable area records and in each case will be plotted as a function of time along the record, suitable timing marks being simultaneously made on the record so that when the same is later examined it will be possible to determine the length of time required for the arrival of the detected waves at any particular one of the detection point. From other data obtained in the area being studied, such as seismic wave velocities in the various earth layers, it is then possible to estimate the depth of the various substrata.

Although it is theoretically possible to time the arrival of a reflected seismic wave by the use of a single geophone and recording device, in practice it is usually difficult and sometimes impossible to pick out indicated reflection waves from a number of other earth vibrations that are detected and recorded at the same time. Therefore the usual practice is to employ a plurality of seismometers spread over a considerable distance along the earth's surface in a selected pattern as just described and to make a plurality of traces in side-by-side relation on a single chart for purposes of comparison, since a reflection from a well-defined stratum will appear on the record as a wave form of increased amplitude on all of the traces in some definite time relation, thus permitting the reflection to be "lined up" on the record.

It has been found that when difficulty is encountered in obtaining suitable reflections on the record in some prospecting areas significant improvements in the ratio of reflection to non-reflection energy or, in other words, in the ratio of essentially vetrical-traveling reflection energy to essentially horizontal-traveling interference energy can often be obtained by using a plurality of geophones at each detection station connected so that their outputs add together, the combined signal being recorded as a single trace on the record. This serves to average out some of the complex earth motions associated with the seismic disturbance and thus give a simpler record.

It is evident that although the use of a plurality of geophones at each detection station produces many advantages the practice does add to the time and labor involved in making each record as well as adding to the investment cost.

One object of the present invention is to provide a method and means for obtaining an increased ratio of reflection to non-reflection energy without at the same time unduly increasing the number of geophones required.

In accordance with the present invention an arrangement of geophones is employed in what may be termed a "tapered array." The geophones are positioned at a number of evenly spaced placement points in such a manner that the amplitude of the geophone output is a maximum at the center of the arrangement and tapers off to a minimum at each end of the arrangement. The taper may be obtained by changing the number of geophones at each placement point or alternatively by using a single geophone in conjunction with a voltage divider network which operates to taper the amplitude of the geophone output in the same manner as if a different number of geophones were used at each placement point.

The nature and objectives of this invention and the advantages obtainable in the practice of the invention will be more fully appreciated when reference is made to the accompanying drawing in which.

Figure 1:
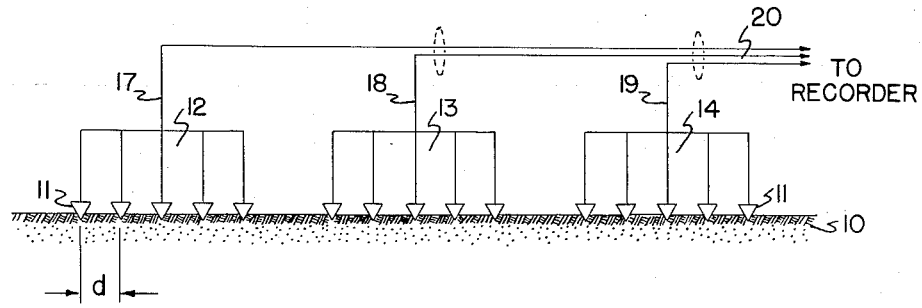
Figure 1 is a schematic diagram of a portion of a conventional multiple geophone spread.

In Figure 1 a portion of a conventional multiple geophone spread is shown. Usually at least twelve channels will be used in the spread but only three geophone channels are represented in the figure. The geophones 11 are placed upon or embedded in the surface of the ground 10 with the separate geophone groups 12, 13, and 14 each positioned at a desired detection station along the profile being prospected, the stations being arranged in line with the shot point. Preferably the geophones in each group are evenly separated by a distance $d$. Suitable connection is made between each of the geophone groups 12, 13, and 14 and separate recording channels in the seismic recording apparatus by means of separate conductors 17, 18, and 19 in a cable 20.

Figure 2:
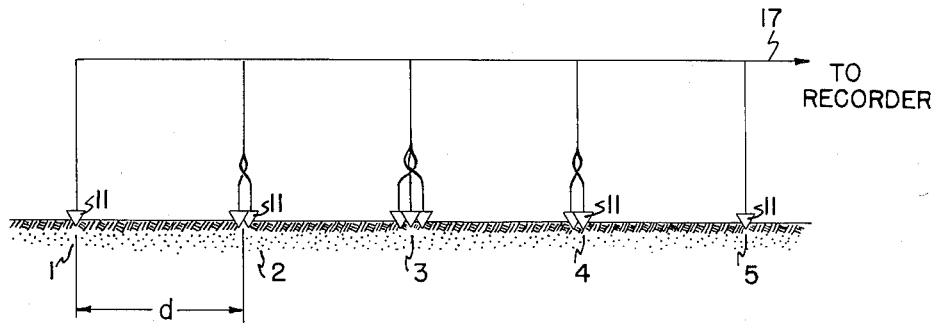
Figure 2 is a schematic plan view of a tapered geophone array using five placement points.

In Figure 2 is shown a schematic plan view of a tapered array of geophones useful in practicing the present invention. One of these arrays is intended to replace each of the geophone groups of Figure 1. The geophones 11 are positioned at five evenly spaced placement points arranged along an essentially straight line, the points being separated by a distance $d$, the total group of placement points covering a distance equivalent to two wave lengths of interference energy for example. The geophones are so arranged that the amplitude of detected reflection energy will be a maximum at the center of the array and a minimum at each of the ends. This is accomplished by positioning three geophones at placement point 3, two geophones at each of placement points 2 and 4 and one geophone at each of placement points 1 and 5. All nine of these geophones are tied into a single channel on the seismic recorder, as by the conductor 17.

It is preferred that the tapered geophone arrays of this invention cover a distance equivalent to at least one wavelength of interference energy. One array will be placed at each of the detection stations in the usual seismic spread. The technique for determining the wavelengths of interfering energy from conventional seismograms is well known to those skilled in the art of seismic prospecting and need not be elaborated upon here.

Figure 3:
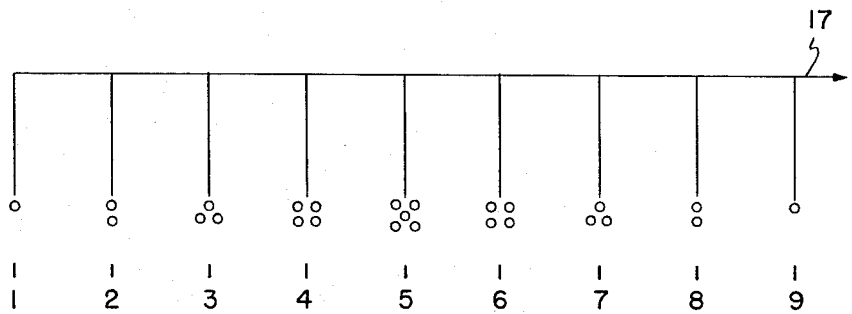
Figure 3 is a schematic plan view of a tapered geophone array using nine placement points.

In Figure 3 is shown a similar tapered geophone array using nine placement points which may be spread over the equivalent of four wave lengths of interference energy, for example. Again the array is such that maximum amplitude of reflected energy is detected at the center of the array and minimum amplitude is detected at each end of the array. The amplitude detection tapers off arithmetically in each direction from the center; thus at placement point 5 five geophones are placed; four geophones are placed at each of placement points 4 and 6; three geophones at placement points 3 and 7; two geophones at placement points 2 and 8; and one geophone at each of points 1 and 9. Again, all of the geophones are connected into a single channel of the seismic recorder, as by the conductor 17.

Figure 4:
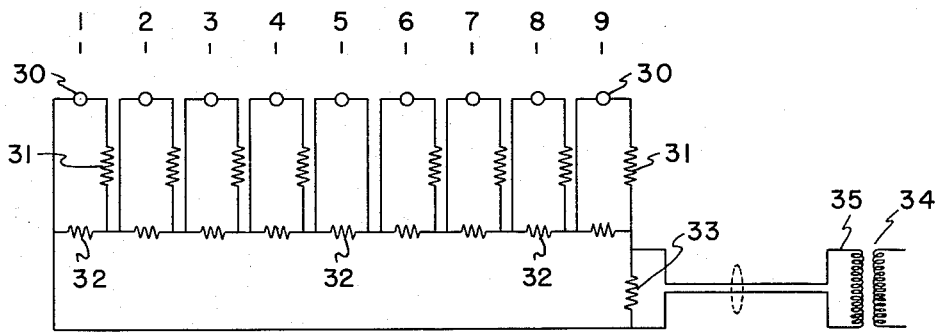
Figure 4 is a schematic diagram of a tapered geophone array wherein a single geophone is used at each placement point.

The same benefit as is obtainable with the twenty-five-geophone array of Figure 3 can be obtained with only nine geophones by using a voltage divider network as shown in Figure 4. A single geophone 30 is placed at each of the nine points and the geophones are connected together in the manner shown in Figure 4 by means of a voltage divider network comprising a series of resistors 31 and 32. All of the resistors 32 are connected in series and each of the geophones 30 and a resistor 31 is connected across each end of one of the resistors 32. By adjusting the relative resistance values of the resistors 31 and 32 associated with each of the geophones it is possible to regulate the amplitude of the output of each geophone so that the geophones at positions 4 and 6 will each produce four-fifths of the amplitude of the geophone at position 5, the output of the geophones at positions 3 and 7 will each produce three-fifths of the amplitude output of the geophone at position 5, and so on.

As a practical example the resistors 31 and 32 may be selected to have the following values:

| Geophone Position | Resistance Values, Ohms | |
|---|---|---|
| | Resistor 31 | Resistor 32 |
| 1 | 192 | 48 |
| 2 | 144 | 96 |
| 3 | 96 | 144 |
| 4 | 48 | 192 |
| 5 | (1) | 240 |
| 6 | 48 | 192 |
| 7 | 96 | 144 |
| 8 | 144 | 96 |
| 9 | 192 | 48 |

1 None used.

This example is intended to apply when the geophones used have a natural frequency of 30 cycles per second, which require about 120 ohms shunt resistance for a 0.5 damping factor. Also all of the geophones 30 are assumed to be identical and to have no internal shunt damping resistor.

In order to maintain a relatively low line impedance along the cable it is preferred to divide the normal 250 ohm load of the transformer 34 at the input to the seismic recorder into two 500 ohm loads by employing a 500 ohm tap 35 at the transformer and a 500 ohm resistor 33 across the voltage divider network as shown.

Figure 5:
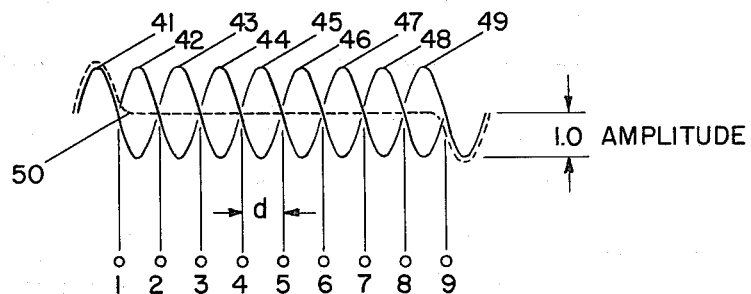
Figure 5 is a graphical representation of the interference cancellation effect obtainable when using a multiple geophone array of the type depicted in Figure 1.

Referring now to Figure 5 the interference cancellation effect obtainable with a conventional nine-geophone array is graphically represented, wherein the interference wave is essentially horizontally traveling. It is assumed that the array of geophones is spread over four wave lengths of interference energy. Thus the distance $d$ between geophones will be one-half wave length. The geophone at position 1 will receive a unit of interference represented by the wave form 41. The geophone at position 2 will receive a unit of interference represented by the wave form 42. Similarly the geophones at positions 3 through 9 will receive interference represented by the wave forms 43 to 49. Each of these wave forms has a positive amplitude of 1.0 and a negative amplitude of 1.0. Since the adjacent geophones are all connected to each other, the positive portion of wave form 42 will cancel the negative portion of wave form 41 and so on. Thus the resultant interference detected by the array of nine geophones will possess the wave form represented by the dashed line 50, having a positive amplitude of 1.0 and a negative amplitude of 1.0. Each of the geophones will also detect the reflection with an amplitude of 1.0. The total reflection amplitude will be the sum of all of the amplitudes or 9.0. Thus the signal-to-noise ratio for the array of nine geophones will be 9.0.

Figure 6:
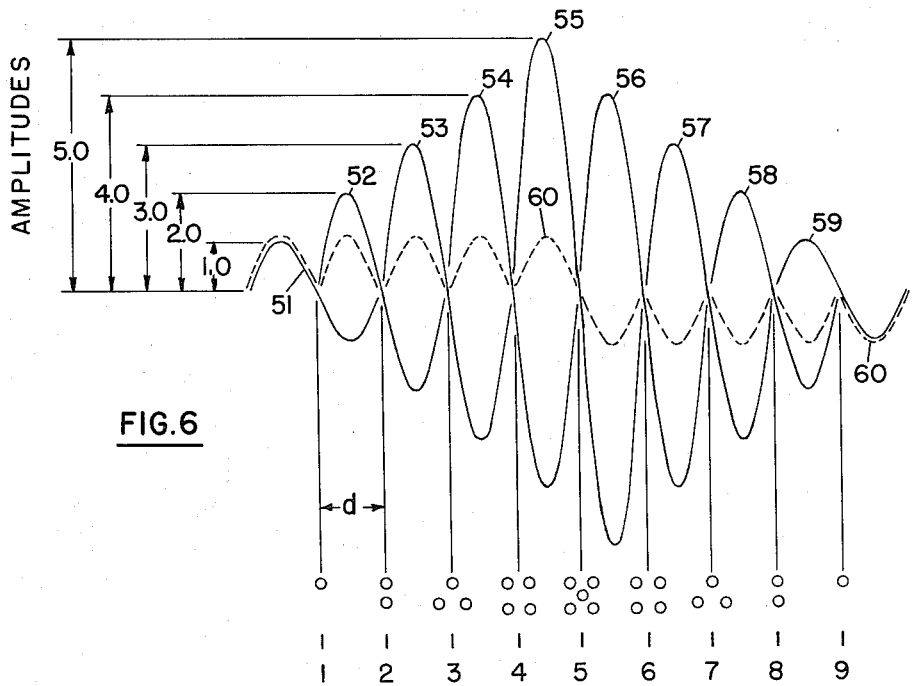
Figure 6 is a graphical representation of the interference cancelling effect obtainable when using the tapered geophone array of the present invention.

Turning now to Figure 6 a similar graphical analysis is presented for the twenty-five-geophone array of Figure 3. The interference detected by the geophone at position 1 will have the wave form 51, having an interference amplitude of 1.0. The two geophones at position No. 2 will produce an interference signal having the wave form 52 having an amplitude of 2.0. Similarly the three geophone at position 3 will produce an interference wave with an amplitude of 3.0, and so on as shown in the figure. Since the negative portion of wave form 51 will counter-balance the positive portion of wave form 52 the net interference amplitude will be 1.0 Likewise the negative portion of wave form 52 will counter-balance the positive portion of wave form 53 and so on through the series of wave forms 51 to 59. The net interference detected by the array of twenty-five geophones will have the wave form represented by the dashed line 60. It will be seen that the maximum amplitude of the interference is 1.0. Since there are twenty-five geophones in the array their combined amplitude for detected reflection energy will be 25.0. Therefore the signal-to-noise ratio for this array will be 25.0, as compared to the signal-to-noise ratio of 9.0 for the non-tapered nine geophone array analyzed in Figure 5. Thus by using nine geophones with a voltage divider network as shown in Figure 4 it is possible to increase the signal-to-noise ratio almost three-fold over the nine-geophone array in which no tapering is used.

It will be apparent to persons skilled in the art that many modifications of this inventoin are possible without departing from its scope. It is therefore intended that the invention not be limited to the specific examples presented. The scope of the invention is defined by the following claims.

What is claimed is:

1. A geophone arrangement for seismic prospecting which comprises a plurality of geophones placed in contact with the earth in an array made up of a plurality of placement points evenly spaced along an essentially straight line, at least one geophone being positioned at each of said placement points, the arrangement being such that the amplitude of the geophone output is a maximum at the center of the array and tapers to a minimum at each end of the array, the outputs of the entire array of geophones being combined.

2. Arrangement as defined in claim 1 wherein said output tapers arithmetically from the center of the array toward each end.

3. Arrangement as defined by claim 1 wherein one geophone is positioned at each of said placement points and including a voltage divider network connected to said geophones to provide said tapered output.

4. Arrangement as defined by claim 1 wherein five placement points are provided, three geophones being positioned at the middle point, one geophone at each of the end points and two geophones at each of the intermediate points.

5. Arrangement as defined by claim 1 wherein nine placement points are provided, five geophones being positioned at the middle point, one geophone at each of the end points of the array and two, three and four geophones respectively at each of the points progressing from each end point toward said middle point.

6. In a system for detecting the arrival of seismic waves from a seismic source at a plurality of detection stations arranged along a selected seismic profile an improved geophone array positioned at each of said detection stations comprising a plurality of geophones arranged at a plurality of evenly spaced placement points in a manner providing for a maximum geophone output at the center of said array and a minimum output at each end of said array, said output tapering uniformly from said center toward each of said ends, the outputs of all of said geophones being combined.

7. In a method of seismic prospecting wherein a seismic disturbance is initiated adjacent the earth's surface and the waves generated thereby travel through the earth to be detected adjacent the earth's surface at one or more points removed from the point of initiation, the improvement which comprises the detection of the waves by means of an array of geophones whose outputs are combined and which are arranged at a plurality of in-line evenly spaced points in a manner providing for a maximum amplitude of geophone output at the middle of the array with the output amplitude tapering to a minimum at each end of the array.

References Cited in the file of this patent

UNITED STATES PATENTS 2,698,927    Parr _____ Jan. 4, 1955